(12) United States Patent
Vagelos

(10) Patent No.: US 12,464,341 B2
(45) Date of Patent: Nov. 4, 2025

(54) DEVICE, PROCESS, AND APPLICATION FOR DETERMINING WIRELESS DEVICE CARRIER COMPATIBILITY

(71) Applicant: TracFone Wireless, Inc., Miami, FL (US)

(72) Inventor: Theodore Vagelos, Miami, FL (US)

(73) Assignee: Tracfone Wireless, Inc., Miami, FL (US)

( * ) Notice: Subject to any disclaimer, the term of this patent is extended or adjusted under 35 U.S.C. 154(b) by 569 days.

(21) Appl. No.: 17/880,257

(22) Filed: Aug. 3, 2022

(65) Prior Publication Data

US 2023/0037997 A1     Feb. 9, 2023

Related U.S. Application Data

(60) Provisional application No. 63/228,766, filed on Aug. 3, 2021.

(51) Int. Cl.
*H04W 8/22*     (2009.01)
*H04W 8/18*     (2009.01)

(52) U.S. Cl.
CPC ............ *H04W 8/22* (2013.01); *H04W 8/183* (2013.01)

(58) Field of Classification Search
CPC ................................. H04W 8/22; H04W 8/183
See application file for complete search history.

(56) References Cited

U.S. PATENT DOCUMENTS

| | | | |
|---|---|---|---|
| 2010/0248719 A1* | 9/2010 | Scholaert | H04M 1/72469 455/434 |
| 2019/0319858 A1* | 10/2019 | Das | H04Q 11/02 |
| 2020/0153080 A1* | 5/2020 | Camacho Perez | H01Q 1/38 |
| 2021/0119724 A1* | 4/2021 | Gapin | H04L 1/0017 |
| 2022/0038249 A1* | 2/2022 | Raghavan | H04L 5/0005 |
| 2022/0086679 A1* | 3/2022 | Briggs | H04W 72/543 |
| 2024/0104615 A1* | 3/2024 | Heine | G06Q 10/30 |

* cited by examiner

*Primary Examiner* — Sujoy K Kundu
*Assistant Examiner* — Andrew Chanul Kim

(57) ABSTRACT

A system configured to determine wireless carrier compatibility information for a wireless device feature for at least one wireless network and a wireless device. The wireless device includes a wireless device processor configured to obtain a wireless device configuration; the wireless device processor further configured to obtain a wireless network configuration; the wireless device processor further configured to analyze the wireless device configuration and the wireless network configuration and determine wireless carrier compatibility information for a wireless device feature; and a display configured to receive the wireless carrier compatibility information and display the wireless carrier compatibility information in response to the wireless device processor for the wireless device feature.

17 Claims, 9 Drawing Sheets

Table 5.5-1 E-UTRA operating bands

| E-UTRA Operating Band | Uplink (UL) operating band BS receive UE transmit $F_{UL\_low} - F_{UL\_high}$ | | Downlink (DL) operating band BS transmit UE receive $F_{DL\_low} - F_{DL\_high}$ | | Duplex Mode |
|---|---|---|---|---|---|
| 1 | 1920 MHz | 1980 MHz | 2110 MHz | 2170 MHz | FDD |
| 2 | 1850 MHz | 1910 MHz | 1930 MHz | 1990 MHz | FDD |
| 3 | 1710 MHz | 1785 MHz | 1805 MHz | 1880 MHz | FDD |
| 4 | 1710 MHz | 1755 MHz | 2110 MHz | 2155 MHz | FDD |
| 5 | 824 MHz | 849 MHz | 869 MHz | 894 MHz | FDD |
| 6[1] | 830 MHz | 840 MHz | 875 MHz | 885 MHz | FDD |
| 7 | 2500 MHz | 2570 MHz | 2620 MHz | 2690 MHz | FDD |
| 8 | 880 MHz | 915 MHz | 925 MHz | 960 MHz | FDD |
| 9 | 1749.9 MHz | 1784.9 MHz | 1844.9 MHz | 1879.9 MHz | FDD |
| 10 | 1710 MHz | 1770 MHz | 2110 MHz | 2170 MHz | FDD |
| 11 | 1427.9 MHz | 1447.9 MHz | 1475.9 MHz | 1495.9 MHz | FDD |
| 12 | 699 MHz | 716 MHz | 729 MHz | 746 MHz | FDD |
| 13 | 777 MHz | 787 MHz | 746 MHz | 756 MHz | FDD |
| 14 | 788 MHz | 798 MHz | 758 MHz | 768 MHz | FDD |
| 15 | Reserved | | Reserved | | FDD |
| 16 | Reserved | | Reserved | | FDD |
| 17 | 704 MHz | 716 MHz | 734 MHz | 746 MHz | FDD |
| 18 | 815 MHz | 830 MHz | 860 MHz | 875 MHz | FDD |
| 19 | 830 MHz | 845 MHz | 875 MHz | 890 MHz | FDD |
| 20 | 832 MHz | 862 MHz | 791 MHz | 821 MHz | FDD |
| 21 | 1447.9 MHz | 1462.9 MHz | 1495.9 MHz | 1510.9 MHz | FDD |
| 22 | 3410 MHz | 3490 MHz | 3510 MHz | 3590 MHz | FDD |
| 23 | 2000 MHz | 2020 MHz | 2180 MHz | 2200 MHz | FDD |
| 24 | 1626.5 MHz | 1660.5 MHz | 1525 MHz | 1559 MHz | FDD |
| 25 | 1850 MHz | 1915 MHz | 1930 MHz | 1995 MHz | FDD |
| 26 | 814 MHz | 849 MHz | 859 MHz | 894 MHz | FDD |
| 27 | 807 MHz | 824 MHz | 852 MHz | 869 MHz | FDD |
| 28 | 703 MHz | 748 MHz | 758 MHz | 803 MHz | FDD |
| 29 | N/A | | 717 MHz | 728 MHz | FDD[2] |
| 30 | 2305 MHz | 2315 MHz | 2350 MHz | 2360 MHz | FDD |
| 31 | 452.5 MHz | 457.5 MHz | 462.5 MHz | 467.5 MHz | FDD |
| 32 | N/A | | 1452 MHz | 1496 MHz | FDD[2] |
| 33 | 1900 MHz | 1920 MHz | 1900 MHz | 1920 MHz | TDD |
| 34 | 2010 MHz | 2025 MHz | 2010 MHz | 2025 MHz | TDD |
| 35 | 1850 MHz | 1910 MHz | 1850 MHz | 1910 MHz | TDD |
| 36 | 1930 MHz | 1990 MHz | 1930 MHz | 1990 MHz | TDD |
| 37 | 1910 MHz | 1930 MHz | 1910 MHz | 1930 MHz | TDD |
| 38 | 2570 MHz | 2620 MHz | 2570 MHz | 2620 MHz | TDD |
| 39 | 1880 MHz | 1920 MHz | 1880 MHz | 1920 MHz | TDD |
| 40 | 2300 MHz | 2400 MHz | 2300 MHz | 2400 MHz | TDD |
| 41 | 2496 MHz | 2690 MHz | 2496 MHz | 2690 MHz | TDD |
| 42 | 3400 MHz | 3600 MHz | 3400 MHz | 3600 MHz | TDD |
| 43 | 3600 MHz | 3800 MHz | 3600 MHz | 3800 MHz | TDD |
| 44 | 703 MHz | 803 MHz | 703 MHz | 803 MHz | TDD |
| 45 | 1447 MHz | 1467 MHz | 1447 MHz | 1467 MHz | TDD |
| 46 | 5150 MHz | 5925 MHz | 5150 MHz | 5925 MHz | TDD[3,2] |
| ... | | | | | |
| 64 | Reserved | | | | |
| 65 | 1920 MHz | 2010 MHz | 2110 MHz | 2200 MHz | FDD |
| 66 | 1710 MHz | 1780 MHz | 2110 MHz | 2200 MHz | FDD[3] |
| 67 | N/A | | 738 MHz | 758 MHz | FDD[2] |
| 68 | 698 MHz | 728 MHz | 753 MHz | 783 MHz | FDD |

NOTE 1: Band 6 is not applicable
NOTE 2: Restricted to E-UTRA operation when carrier aggregation is configured. The downlink operating band is paired with the uplink operating band (external) of the

FIG. 3

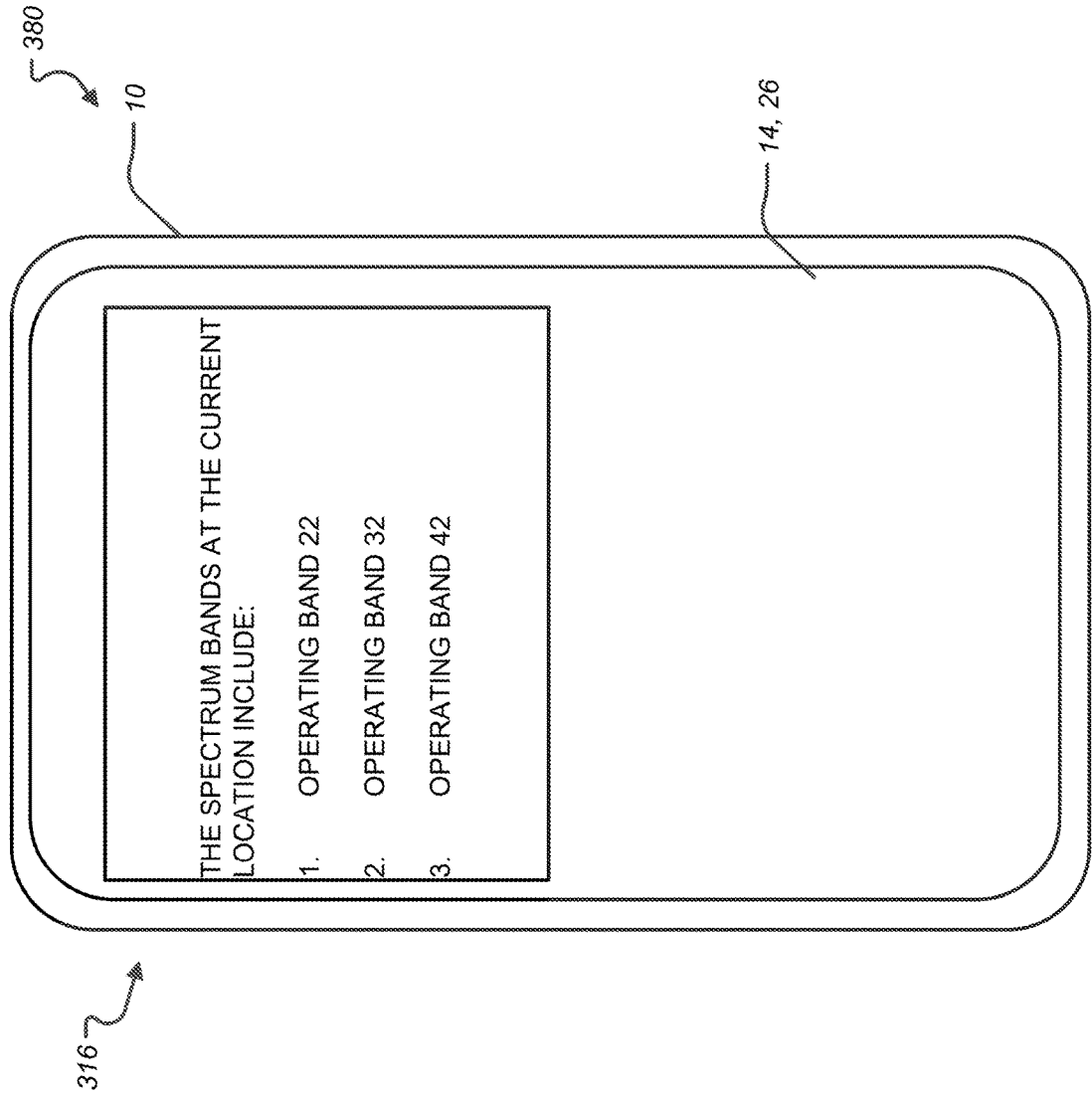

ical Field

The present disclosure generally relates to an application, system, and method for determining wireless device carrier compatibility.

DEVICE, PROCESS, AND APPLICATION FOR DETERMINING WIRELESS DEVICE CARRIER COMPATIBILITY

CROSS-REFERENCE TO RELATED APPLICATIONS

This application claims the benefit of U.S. Provisional Application No. 63/228,766 filed on Aug. 3, 2021 and entitled "Device, Process, and Application to Determine Wireless Device Carrier Compatibility," the content of which is incorporated by reference herein in its entirety.

TECHNICAL FIELD

The present disclosure generally relates to an application, system, and method for determining wireless device carrier compatibility.

BACKGROUND

A large number of wireless carriers and wireless devices exist for customers desiring wireless services such as data, talk, text messaging, and the like. The wireless providers of those services typically provide wireless services from a wireless network to the wireless device utilizing various wireless protocols over a communication channel. Wireless devices may be implemented to provide a full suite of features. However, some of the features of the wireless devices may be wireless carrier specific, wireless device specific, and/or the like. However, a wireless device user desiring to utilize their wireless device with various features may not have any readily available information to determine whether a wireless carrier, their device, another wireless carrier and/or the like may be compatible to support one or more of the various features for their wireless device.

Accordingly, a need exists to provide a wireless user with information to determine whether a wireless device and/or a wireless carrier supports implementation of various features of a wireless device.

SUMMARY

The foregoing needs are met, to a great extent, by the disclosure, providing a device, a process, and/or an application to determine wireless device carrier compatibility. For example, wireless carrier compatibility information for a wireless device feature may be determined for at least one wireless network and a wireless device. A system may include the wireless device, including a wireless device processor configured to obtain a wireless device configuration. The wireless device processor may be configured to obtain a wireless network configuration and analyze the wireless device configuration and the wireless network configuration. Wireless carrier compatibility information may be determined for a wireless device feature. And a display may be configured to receive the wireless carrier compatibility information and display the wireless carrier compatibility information in response to the wireless device processor for the wireless device feature, the wireless device processor being configured to obtain the wireless device configuration and the wireless network configuration at least in part from one of the following: a wireless device application and a wireless carrier compatibility information processor.

The method is implemented by a system comprising one or more hardware processors configured by machine-readable instructions and/or other components. The system comprises the one or more processors and other components or media, e.g., upon which machine-readable instructions may be executed. Implementations of any of the described techniques and architectures may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

FIG. 3 illustrates a Table listing wireless carrier operating bands.

FIG. 9 illustrates a fifth exemplary graphical user interface according to aspects of the disclosure.

DETAILED DESCRIPTION

Figure 1:
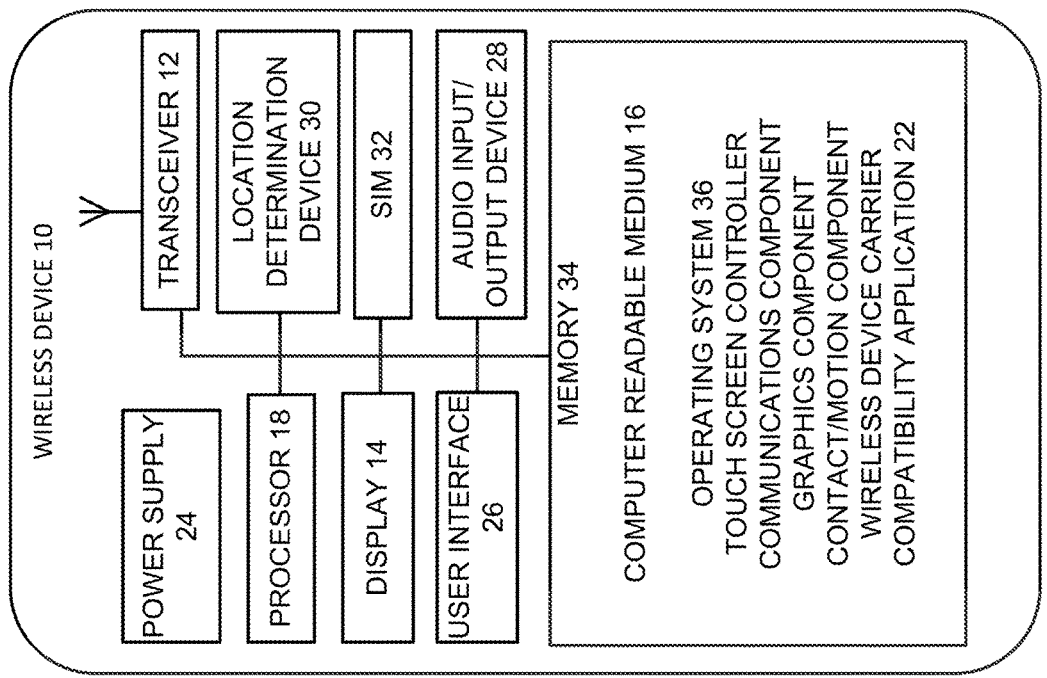
FIG. 1 illustrates an exemplary wireless device and its components, in accordance with aspects of the disclosure.

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

Presently disclosed are ways of classifying media (e.g., ad media, on-demand video, live-streaming video, or other imagery). Such media may be any type of content, but for the sake of a clear explanation, most of the examples provided herein relate to advertisement (ad) content are described.

A large number of wireless service plans exist for customers desiring wireless services such as data, talk, and text messaging. To obtain these wireless services, customers generally have the option of entering into a post-paid service (e.g., contract for a period of time) or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNO) that maintain and control their own wireless networks. An MNO heavily relies on backend systems to address any provisional, billing, security, and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data, number of minutes of airtime/voice, and number of text messages used. In this regard, MVNOs may have a plurality of agreements with and the rights to use a plurality of MNO networks.

Convenience, timeliness, cost, service, and reliability of a wireless device and/or the wireless providers' systems and services are key factors that play into a user's experience. By developing a system to improve at least these factors, a more positive experience can be provided to the wireless user. The improved experience will help retain customer base and increase the number of customers willing to purchase wireless services. In order to do so, the following needs can be addressed by providing a device, a process, and/or an application to determine wireless device carrier compatibility.

In this disclosure and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, Internet of things (IoT) based wireless devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network, 4G, 5G, a Wi-Fi network, a network implementing a communication channel as defined herein, and the like that may utilize the teachings of the disclosure.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not for other aspects.

One or more aspects of the disclosure include a smartphone, a smartphone process, a smartphone application, a wireless device, a wireless device process, a wireless device application, and/or the like that may check a device type and configuration for carrier compatibility of implementation of various features. For example, one or more aspects of the disclosure include a smartphone, a smartphone process, a smartphone application, a wireless device, a wireless device process, a wireless device application, and/or the like that may check a device type based on device identification that may include an International Mobile Equipment Identity (IMEI) and a configuration that may include carrier spectrum bands for carrier compatibility of implementation of various features such as Voice over Long-Term Evolution (VoLTE) (4G/5G), VoWiFi (Voice over Wireless Fidelity), communication features, network features, Wi-Fi features, broadband features, networking features, application features, Internet of things (IoT) features, peripheral features, mobile body area networks (MBAN) features, entertainment features, encryption features, virtual private network features, multimedia features, quality of service features, ViLTE (Video over LTE) features, Session Initiation Protocol (SIP) features, Application Server (AS) features, IP Multimedia Subsystem (IMS) architectural framework features, MNO features, MVNO features, compatibility features, Enhanced Voice Services (EVS) features, source-controlled variable bit-rate (SC-VBR) features, voice/sound activity detector (VAD) features, comfort noise generation (CNG) features, error concealment (EC) for packet loss in networks features, channel-aware mode to improve frame/packet error resilience features, jitter buffer management (JBM) features, and/or the like.

In this regard, wireless devices may be implemented to provide a full suite of features. However, some of the features of the wireless devices may be wireless carrier specific, wireless device specific, and/or the like. For example, wireless devices may implement VoLTE. However, implementation of VoLTE by the wireless device may be wireless carrier specific, wireless device specific, and/or the like. As another example, wireless devices may implement VoWiFi. However, implementation of VoWiFi by the wireless device may be wireless carrier specific, wireless device specific, and/or the like.

Accordingly, a wireless device user desiring to utilize their wireless device with various features utilizing a current wireless carrier may not have any readily available information to determine whether a wireless carrier, their device, another wireless carrier, and/or the like may support the various features for their wireless device. Moreover, a wireless device user desiring to utilize their wireless device with various features and further desiring to switch carriers may not have any readily available information to determine whether a wireless carrier, their device, another wireless carrier, and/or the like may support the various features for their wireless device.

The disclosed smartphone, smartphone process, smartphone application, wireless device, wireless device process, wireless device application, and/or the like may check a wireless device type and configuration for wireless carrier compatibility of implementation of various features to determine if the wireless device is compatible with a wireless carrier system and configuration. The various features may include VoLTE, VoWiFi, and/or the like.

Additionally, the disclosed smartphone, smartphone process, smartphone application, wireless device, wireless device process, wireless device application, and/or the like may check a wireless device type and configuration and determine which one or more wireless carriers have carrier compatibility for implementation of various features. The various features may include VoLTE, VoWiFi, and/or the like.

Additionally, the disclosed smartphone, smartphone process, smartphone application, wireless device, wireless device process, wireless device application, and/or the like may check a device type and configuration and determine which spectrum bands are currently available based on a wireless device location. For example, if the wireless device is used often in a particular location, such as a customer's home, a customer's office, and/or the like, the disclosed smartphone, smartphone process, smartphone application, wireless device, wireless device process, wireless device application, and/or the like may determine which spectrum bands are currently available based on a wireless device location.

Moreover, the disclosed smartphone, smartphone process, smartphone application, wireless device, wireless device process, wireless device application, and/or the like may check a device type and configuration and determine which spectrum bands are currently available based on a wireless device location for implementation of various features. For example, if the wireless device is used often in a particular location, such as a customer's home, a customer's office, and/or the like the disclosed smartphone, smartphone process, smartphone application, wireless device, wireless device process, wireless device application, and/or the like that may check a device type and configuration and determine which spectrum bands are currently available based on a wireless device location for implementation of various features. The various features may include VoLTE, VoWiFi, and/or the like.

One of the various features may include Voice over Long-Term Evolution (VoLTE). VoLTE is a high-speed wireless communication standard for wireless devices. In some aspects, VoLTE may have more voice and/or data capacity than other network implementations such as 3G (third generation of wireless mobile telecommunications technology) UMTS (Universal Mobile Telecommunications System), 2G (second-generation cellular network) GSM (Global System for Mobile Communications), and/or the like. Moreover, VoLTE may use less bandwidth in part because VoLTE implements packet headers that may be smaller than those of unoptimized VoIP (Voice over Internet Protocol), LTE (Long Term Evolution), and/or the like.

To be able to make a VoLTE call, the wireless device, the wireless device firmware, the wireless carrier, and/or the like may all need to support VoLTE call service in an area where the wireless device is utilized. Moreover, these features and possibly others must be enabled, configured, and/or the like to work together.

In various aspects of the disclosure, implementation of VoLTE may be based on an IP (Internet protocol) Multimedia Subsystem (IMS) architectural framework, with specific profiles for control and media planes of voice service. The IMS architectural framework may facilitate implementation of VoLTE by the wireless device on an LTE wireless broadband service as well as others. The IMS architectural framework may provide voice service, including control and media planes, being delivered as data flows within an LTE data bearer, which may have no dependency on a circuit-switched voice network to be in the call path.

To ensure compatibility by the wireless device to implement VoLTE, the wireless device may need to implement a particular type of codec (coder/decoder), one of a limited number of types of codecs, and/or the like. For example, to ensure compatibility by the wireless device to implement VoLTE, the wireless device may need to implement to an AMR-NB (Adaptive Multi-Rate—Narrow Band) codec, its functional equivalent, and/or the like. As another example, to ensure compatibility by the wireless device to implement VoLTE, the wireless device may need to implement to an AMR-WB (Adaptive Multi-Rate—Wide Band) codec, its functional equivalent, and/or the like. As another example, to ensure compatibility by the wireless device to implement VoLTE, the wireless device may need to implement to an AAC-ELD (Advanced Audio Coding—Enhanced Low Delay) codec, its functional equivalent, and/or the like.

To ensure compatibility by the wireless device to implement VoLTE, the carrier may need to support certain services, certain spectrums or bands, and/or the like. For example, a number of wireless carriers and wireless devices support Enhanced Voice Services (EVS). The EVS may include implementation of a superwideband (50-14,000 Hz), a fullband (20-20,000 Hz), and/or the like to support EVS, VoLTE, other various features, and/or the like. The EVS may include implementation support for various codecs and may moreover be backwards-compatible with various codecs, such as the AMR-WB codec.

VoWiFi may be implemented as Voice over EPC-integrated (Evolved Packet Core—integrated) Wi-Fi (Wireless Fidelity). VoWiFi may be considered a complementary technology to VoLTE and may utilize IMS technology to provide a packet voice service delivered over IP via a Wi-Fi network. In aspects, VoLTE calls may be seamlessly handed over between LTE and Wi-Fi and vice versa. Accordingly, VoWiFi may require network compatibility similar to VoLTE.

Other features may include communication features, network features, Wi-Fi features, broadband features, networking features, application features, Internet of things (IoT) features, peripheral features, mobile body area networks (MBAN) features, entertainment features, encryption features, virtual private network features, multimedia features, quality of service features, ViLTE (Video over LTE) features, Session Initiation Protocol (SIP) features, Application Server (AS) features, IP Multimedia Subsystem (IMS) architectural framework features, MNO features, MVNO features, compatibility features, Enhanced Voice Services (EVS) features, source-controlled variable bit-rate (SC-VBR) features, voice/sound activity detector (VAD) features, comfort noise generation (CNG) features, error concealment (EC) for packet loss in networks features, channel-aware mode to improve frame/packet error resilience features, jitter buffer management (JBM) features, and/or the like.

FIG. 1 illustrates an exemplary wireless device and its components, in accordance with aspects of the disclosure.

Aspects of FIG. 1 may include any one or more features, aspects, components, processes, and/or the like as described elsewhere herein. In particular, FIG. 1 illustrates an exemplary implementation of a wireless device 10. The wireless device 10 may include a transceiver 12, a display 14, a computer readable medium 16, a processor 18, a location determination device 30, a user interface 26, an audio input/output device 28, a subscriber identity module (SIM) card or SIM 32, a memory 34, a codec, firmware, and/or the like.

Additionally, the wireless device 10 may have a wireless device configuration that may include any one or more wireless device aspects as described herein as well as others. The wireless device configuration may support and/or allow implementation of various features by the wireless device 10 in conjunction with a wireless network as described herein.

The wireless device configuration may be determined by an identification of the wireless device 10, such as the IMEI, a mobile equipment identifier (MEID), an Electronic serial number (ESN), and/or the like. The identification of the wireless device 10 may be associated with various aspects of the wireless device configuration. The wireless device configuration may also be determined based on a type, version, a characteristic of, and/or the like of the transceiver 12, the processor 18, the subscriber identity module (SIM) card or SIM 32, the codec, the firmware, and/or the like.

The wireless network may also have various wireless network configurations that may support and/or allow implementation of various features. Accordingly, implementation of these various features by the wireless device 10 may require compatibility, support, enablement, and/or the like of the wireless device 10, the wireless device configuration, the wireless network, the wireless network configuration, and/or the like. The wireless network configurations may include carrier spectrum bands for carrier compatibility of implementation of various features such as Voice over Long-Term Evolution (VoLTE) (4G/5G), VoWiFi (Voice over Wireless Fidelity), and/or the like. The wireless network configurations may include a determination of whether the carrier supports certain services, certain spectrums, and/or the like. In one aspect, the wireless network configurations may include a determination of support of Enhanced Voice Services (EVS). In one aspect, the wireless network configurations may include a determination of support for various codecs.

The wireless device 10 may further include a wireless device carrier compatibility application 22. Alternatively, the wireless device 10 may be configured to implement functionality consistent with the wireless device carrier compatibility application 22. In yet another aspect, the wireless device 10 may be configured to implement a process consistent with the wireless device carrier compatibility application 22. However, for brevity, reference will be made to implementation of the wireless device carrier compatibility application 22 by the wireless device 10. As further described herein, the wireless device carrier compatibility application 22 may determine various aspects of implementation of the various features by the wireless device 10 by determining compatibility, support, enablement, and/or the like of the wireless device 10, the wireless device configuration, the wireless network, the wireless network configuration, and/or the like. In some aspects, the wireless device carrier compatibility application 22 in conjunction with a wireless carrier compatibility information processor 158, a system 252, a database 160 and/or the like may determine various aspects of implementation of these various features by the wireless device 10 by determining compatibility, support, enablement, and/or the like of the wireless device 10, the wireless device configuration, the wireless network, the wireless network configuration, and/or the like.

The transceiver 12 can include, for example, a wireless antenna and associated circuitry capable of data transmission with a mobile data network utilizing at least one data transmission protocol utilizing one or more communication channels as defined herein. The transceiver 12 may transmit and receive data utilizing the data transmission protocol. Moreover, the transceiver 12 may provide voice and text message capabilities. In one aspect, the processor 18 and/or the transceiver 12 may be implemented as a wireless device chipset.

The display 14 of the wireless device 10 may be configured to display various information provided to the display 14 from the processor 18 of the wireless device 10, the computer readable medium 16, the wireless device carrier compatibility application 22, and/or the like. The screen may be a light-emitting diode display (LED), an electroluminescent display (ELD), a plasma display panel (PDP), a liquid crystal display (LCD), an organic light-emitting diode display (OLED), an active-matrix organic light-emitting diode (AMOLED) display, an IPS (In-plane switching) liquid crystal display (LCD), or any other display technology.

The displayed information can include, for example, a graphical user interface for displaying icons, the network connection strength, the type of mobile network data connection (such as 3G, 4G LTE, EVDO, Wi-Fi, etc.) the wireless device 10 is connected to, and/or other information potentially useful to the user. The information may be displayed simultaneously or the user may interact with an input device such as buttons on the wireless device 10 or, if the display 14 is a touch-screen, with the icons on the display 14 to cycle through the various types of information for display.

The wireless device 10 may also have a power supply 24. The power supply 24 may be a battery such as nickel cadmium, nickel metal hydride, lead acid, lithium ion, lithium ion polymer, and the like. The wireless device 10 may also include the memory 34, which may be an internal memory and/or a removable storage type such as a memory chip. The memory 34 may store information about the wireless device 10, including wireless profiles and settings. Additionally, the wireless device 10 may include the audio input/output device 28 for the input or output of sounds in videos, music, and the like.

The wireless device 10 may also have a user interface 26 to facilitate use of the wireless device 10 with an operating system 36. The operating system 36 may be associated with a touchscreen controller, one or more communications components, one or more graphics components, one or more contact/motion components, and the like.

In some aspects, the wireless device 10 and/or a wireless network 102 may estimate the location of the wireless device 10 based, at least in part, on a global navigation satellite system (GNSS) with the location determination device 30. In another aspect, a wireless network 102 may secure location determination based on a specific cell in which the wireless device 10 connects. In yet another aspect, a wireless network 102 may obtain location determination based on triangulation with respect to a plurality of cells in which the wireless device 10 receives signals. In yet another aspect, a wireless network 102 may obtain location determination based on a Location Area Code (LAC) for the wireless device 10. In yet another aspect, a wireless network 102 may obtain location determination based on a current cell tower identification (ID) that the wireless device 10 connects.

Figure 2:
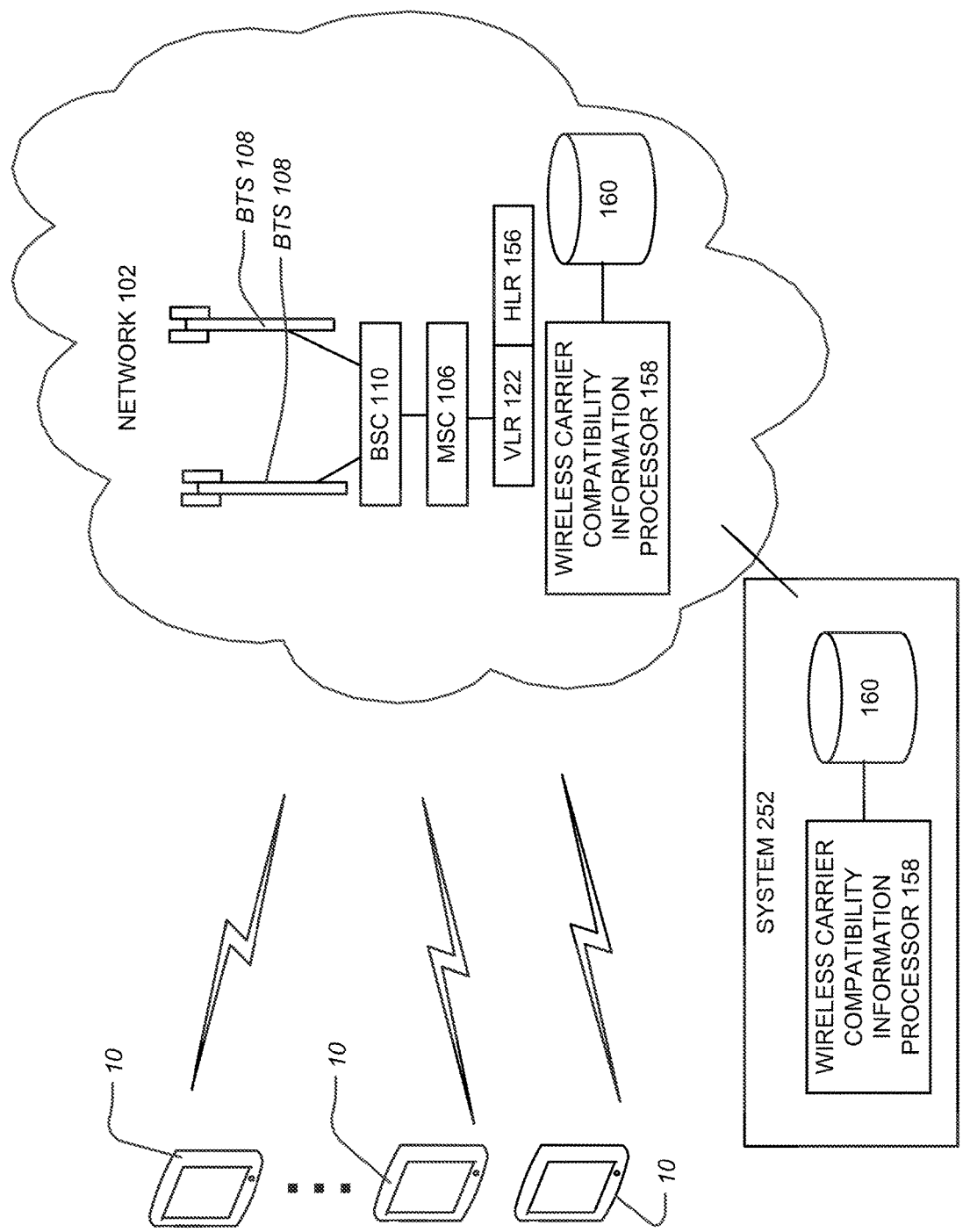
FIG. 2 illustrates an exemplary wireless network, in accordance with aspects of the disclosure.

FIG. 2 illustrates an exemplary wireless network, in accordance with aspects of the disclosure.

Aspects of FIG. 2 may include any one or more features, aspects, components, processes, and/or the like as described elsewhere herein. In particular, FIG. 2 illustrates a wireless network 102 that may include a Mobile services Switching Center (MSC) 106 that may perform the switching of calls and that may include a Visitor Location Register (VLR) 122. The wireless network 102 may also include a Base Transceiver Station (BTS) 108 and a Base Station Controller (BSC) 110. The Base Transceiver Station (BTS) 108 houses the radio transceivers that define a cell and handle the radio-link protocols with the wireless device 10. The Base Station Controller (BSC) 110 may manage the radio resources for one or more Base Transceiver Station (BTS) 108. The Base Station Controller (BSC) 110 may be the connection between the wireless device 10 and the Mobile service Switching Center (MSC) 106.

A Home Location Register (HLR) 156 and the Visitor Location Register (VLR) 122 together with the Mobile services Switching Center (MSC) 106 may provide the call-routing and roaming capabilities. The Home Location Register (HLR) 156 may contain all the administrative information of each subscriber registered in the corresponding implementation of the wireless network 102, along with the current location of the wireless device 10. Other types of networks, implementations of networks, and/or the like are contemplated and may be utilized in conjunction with the disclosure.

The wireless network 102 may include a radio access network (RAN). The radio access network (RAN) may be implemented as part of a mobile telecommunication system of the wireless network 102. The radio access network (RAN) may implement a radio access technology. The radio access network (RAN) may reside between the wireless device 10 and the wireless network 102 and may provide a connection with a core network (CN). Other types of networks, implementations of networks, and/or the like are contemplated and may be utilized in conjunction with the disclosure.

Additionally, the wireless network 102 may be configured to provide wireless carrier compatibility information. The wireless carrier compatibility information may be obtained from one or more of a switch, the Mobile services Switching Center (MSC) 106, the Home Location Register (HLR) 156, the Visitor Location Register (VLR) 122, the home subscriber server (HSS), a Unified Data Management (UDM), a wireless carrier compatibility information processor, a wireless carrier compatibility information server, and/or the like.

For brevity of the disclosure, hereinafter the wireless carrier compatibility information may be referred to as being obtained from a wireless carrier compatibility information processor 158. The wireless carrier compatibility information processor 158 may include a database 160 to store the wireless carrier compatibility information. The wireless carrier compatibility information processor 158 and/or the database 160 may be implemented as part of the wireless network 102. Alternatively, the wireless carrier compatibility information processor 158 and/or the database 160 may be implemented as part of a system 252.

The wireless carrier compatibility information may include one or more types of information regarding the wireless device 10, the wireless device configuration, the wireless network, the wireless network configuration, and/or the like. In particular, the wireless carrier compatibility information processor 158, the system 252, the database 160, the wireless device carrier compatibility application 22, and/or the like may determine various aspects of implementation of these various features by the wireless device 10 by determining compatibility, support, enablement, and/or the like of the wireless device 10, the wireless device configuration, the wireless network, the wireless network configuration, and/or the like. In some aspects, the wireless device carrier compatibility application 22 in conjunction with the wireless carrier compatibility information processor 158, the system 252, and/or the database 160 may determine various aspects of implementation of these various features by the wireless device 10 by determining compatibility, support, enablement, and/or the like of the wireless device 10, the wireless device configuration, the wireless network, the wireless network configuration, and/or the like. In some aspects, the wireless device carrier compatibility application 22 in conjunction with the wireless carrier compatibility information processor 158, the system 252, and/or the database 160 and a location of the wireless device 10 may determine various aspects of implementation of these various features by the wireless device 10 by determining compatibility, support, enablement, and/or the like of the wireless device 10, the wireless device configuration, the wireless network, the wireless network configuration, and/or the like based on the location of the wireless device 10.

The wireless carrier compatibility information processor 158 may implement one or more processors, servers, or the like. The system 252 may be cloud-based, network-based, or the like. In one aspect, the system 252 may include at least one server. In one aspect, the wireless carrier compatibility information processor 158 may be a wireless carrier compatibility information processor. In one aspect, the system 252 may be implemented by a MVNO. In one aspect, the system 252 may be implemented by an MNO. In one aspect, the system 252 may be implemented by a third party.

In aspects, the wireless carrier compatibility information processor 158 may include an Application Programming Interface (API) and/or the wireless carrier compatibility information processor 158 may include Application Programming Interface (API). More specifically, the wireless carrier compatibility information processor 158 may include one or more Application Programming Interfaces (API) such that the wireless carrier compatibility information processor 158 receives the wireless carrier compatibility information from the wireless device 10, the wireless network 102, the system 252, the database 160, and/or the like.

Additionally, the wireless carrier compatibility information may include this information associated with each wireless subscriber. Accordingly, the database 160 may store the wireless carrier compatibility information together with an identification that associates it to each wireless subscriber and the wireless device 10 associated with each wireless subscriber. In particular, the database 160 may store user equipment information associated with each wireless subscriber. In particular, the user equipment information associated with each wireless subscriber may include the type of wireless device 10 being utilized by each wireless subscriber.

The wireless carrier compatibility information processor 158 may be configured analyze the wireless carrier compatibility information at a per wireless subscriber level in order to determine device compatibility with the wireless carrier. For example, the wireless carrier compatibility information processor 158 may be configured to analyze the wireless carrier compatibility information in order to determine device compatibility with the wireless carrier and the like in association with the geographic location of the subscriber and the type of wireless equipment.

The geographic location of the subscriber and/or the wireless device 10 may be based on a current cell tower identification (ID) that the wireless device 10 connects, a Location Area Code (LAC) for the wireless device 10, location information provided by the wireless device 10, and/or the like. The location information may be provided by the wireless device 10 and may be provided by a location determination device 30. The location information may be provided to the wireless network 102, the system 252, the wireless carrier compatibility information processor 158, and/or the like and stored in the database 160.

Additionally, the wireless device carrier compatibility application 22 in conjunction with the wireless carrier compatibility information processor 158, the system 252, and/or the database 160 may determine various aspects of implementation of these various features by the wireless device 10 by determining the particular bands implemented by the wireless carrier. For example, wireless service from a wireless carrier or wireless network may be allocated use of one or more particular bands. Each band may implement a particular duplex mode that may include one of Frequency Division Duplexing (FDD), Time division duplex (TDD), Supplemental Downlink (SDL), and/or the like. Each band may further include an operating frequency, a subset of bands, an uplink frequency, a downlink frequency, a duplex spacing, a channel bandwidth, and/or the like. The details of which are described in Table 5.5-1 "E-UTRA Operating Bands" and 5.6.1-1 "E-UTRA Channel Bandwidth" of 3GPP TS 36.101. A reproduction of Table 5.5-1 "E-UTRA Operating Bands" is illustrated in FIG. 3. Typically, a particular wireless carrier may be allocated a portion of the various bands; and another particular wireless carrier may be allocated another portion of the various bands. This allocated portion of bands for a particular wireless service provider may not be compatible for a wireless user based on the user's wireless device, the user's geographic location, and/or the like.

In one aspect, the wireless device carrier compatibility application 22, the wireless carrier compatibility information processor 158, the system 252, and/or the database 160 may determine various aspects of implementation of various features by the wireless device 10 by determining compatibility, support, enablement, and/or the like of the wireless device 10, the wireless device configuration, the wireless network, the wireless network configuration, and/or the like by determining an identification of the wireless device 10, such as the IMEI, the MEID, the ESN, and/or the like. The identification of the wireless device 10 may be associated with various aspects of the wireless device configuration. Thereafter, the wireless device configuration may be compared to the wireless network, the wireless network configuration, and/or the like for a plurality of wireless networks, wireless carriers, available wireless networks and/or the like to determine compatibility and implementation of various features by the wireless device 10. The various features may include VoLTE, VoWiFi, and/or the like.

In one aspect, the wireless device carrier compatibility application 22, the wireless carrier compatibility information processor 158, the system 252, and/or the database 160 may store, retrieve, access, and/or the like data, information, and/or the like with respect to wireless device configuration. Additionally, the wireless device carrier compatibility application 22, the wireless carrier compatibility information processor 158, the system 252, and/or the database 160 may store, retrieve, access, and/or the like data, information, and/or the like with respect to the wireless network, the wireless network configuration, and/or the like Thereafter, the wireless device configuration may be compared to the wireless network, the wireless network configuration, and/or the like for a plurality of wireless networks, wireless carriers, available wireless networks and/or the like to determine compatibility and implementation of various features by the wireless device 10. The various features may include VoLTE, VoWiFi, and/or the like.

In one aspect, the wireless device carrier compatibility application 22, the wireless carrier compatibility information processor 158, the system 252, and/or the database 160 may determine various aspects of implementation of various features by the wireless device 10 by determining compatibility, support, enablement, and/or the like of the wireless device 10, the wireless device configuration, the wireless network, the wireless network configuration, and/or the like by determining a type, version, a characteristic of, and/or the like of the transceiver 12, the processor 18, the subscriber identity module (SIM) card or SIM 32, the codec, the firmware, and/or the like associated with various aspects of the wireless device configuration. Thereafter, the wireless device configuration may be compared to the available wireless networks to determine compatibility and implementation of various features by the wireless device 10. The various features may include VoLTE, VoWiFi, and/or the like.

In one aspect, the wireless device carrier compatibility application 22, the wireless carrier compatibility information processor 158, the system 252, and/or the database 160 may determine various aspects of implementation of various features by the wireless device 10 by determining compatibility, support, enablement, and/or the like of the wireless device 10, the wireless device configuration, the wireless network, the wireless network configuration, and/or the like by determining whether the wireless device, the wireless device firmware, the wireless carrier, and/or the like support feature service in an area where the wireless device 10 is utilized. Moreover, this may further include determining if various aspects are enabled, configured, and/or the like to work together. Thereafter, the wireless device configuration may be compared to the available wireless networks to determine compatibility and implementation of various features by the wireless device 10. The various features may include VoLTE, VoWiFi, and/or the like.

In one aspect, the wireless device carrier compatibility application 22, the wireless carrier compatibility information processor 158, the system 252, and/or the database 160 may determine various aspects of implementation of various features by the wireless device 10 by determining compatibility, support, enablement, and/or the like of the wireless device 10, the wireless device configuration, the wireless network, the wireless network configuration, and/or the like by determining whether the wireless carriers are implementing an IP (Internet protocol) Multimedia Subsystem (IMS) architectural framework. Thereafter, the wireless device configuration may be compared to the available wireless networks to determine compatibility and implementation of various features by the wireless device 10. The various features may include VoLTE, VoWiFi, and/or the like.

In one aspect, the wireless device carrier compatibility application 22, the wireless carrier compatibility information processor 158, the system 252, and/or the database 160 may determine various aspects of implementation of various features by the wireless device 10 by determining compatibility, support, enablement, and/or the like of the wireless device 10, the wireless device configuration, the wireless network, the wireless network configuration, and/or the like by determining whether the wireless carriers are implementing Enhanced Voice Services (EVS). Thereafter, the wireless device configuration may be compared to the available wireless networks to determine compatibility and implementation of various features by the wireless device 10. The various features may include VoLTE, VoWiFi, and/or the like.

In one aspect, the wireless device carrier compatibility application 22, the wireless carrier compatibility information processor 158, the system 252, and/or the database 160 may determine various aspects of implementation of various features by the wireless device 10 by determining compatibility, support, enablement, and/or the like of the wireless device 10, the wireless device configuration, the wireless network, the wireless network configuration, and/or the like by determining whether the wireless carriers are implementing particular wireless bands. Thereafter, the wireless device configuration may be compared to the available wireless networks to determine compatibility and implementation of various features by the wireless device 10. The various features may include VoLTE, VoWiFi, and/or the like.

In one aspect, the wireless device carrier compatibility application 22, the wireless carrier compatibility information processor 158, the system 252, and/or the database 160 may determine various aspects of implementation of various features by the wireless device 10 by determining compatibility, support, enablement, and/or the like of the wireless device 10, the wireless device configuration, the wireless network, the wireless network configuration, and/or the like utilizing any aspect as described herein. Thereafter, the wireless device configuration may be compared to the available wireless networks to determine compatibility and implementation of various features by the wireless device 10. The various features may include VoLTE, VoWiFi, and/or the like.

In one aspect, the wireless device carrier compatibility application 22, the wireless carrier compatibility information processor 158, the system 252, and/or the database 160 may determine various aspects of implementation of various features by the wireless device 10 by determining compatibility, support, enablement, and/or the like of the wireless device 10, the wireless device configuration, the wireless network, the wireless network configuration, and/or the like utilizing any aspect as described herein. Thereafter, the wireless device carrier compatibility application 22, the wireless carrier compatibility information processor 158, the system 252, and/or the database 160 may determine and output modifications needed for the wireless device configuration to provide compatibility and implementation of various features by the wireless device 10. The various features may include VoLTE, VoWiFi, and/or the like. For example, the output may provide information to update, modify, load, and/or the like software, firmware, and/or the like of the wireless device 10, change networks, modify network settings, update a type of wireless device, a type, version, a characteristic of, and/or the like of the transceiver 12, the processor 18, the subscriber identity module (SIM) card or SIM 32, the codec, the firmware, and/or the like. Thereafter, a wireless user may take the necessary steps consistent with the output to obtain compatibility and implementation of various features by the wireless device 10. The various features may include VoLTE, VoWiFi, and/or the like.

Figure 4:
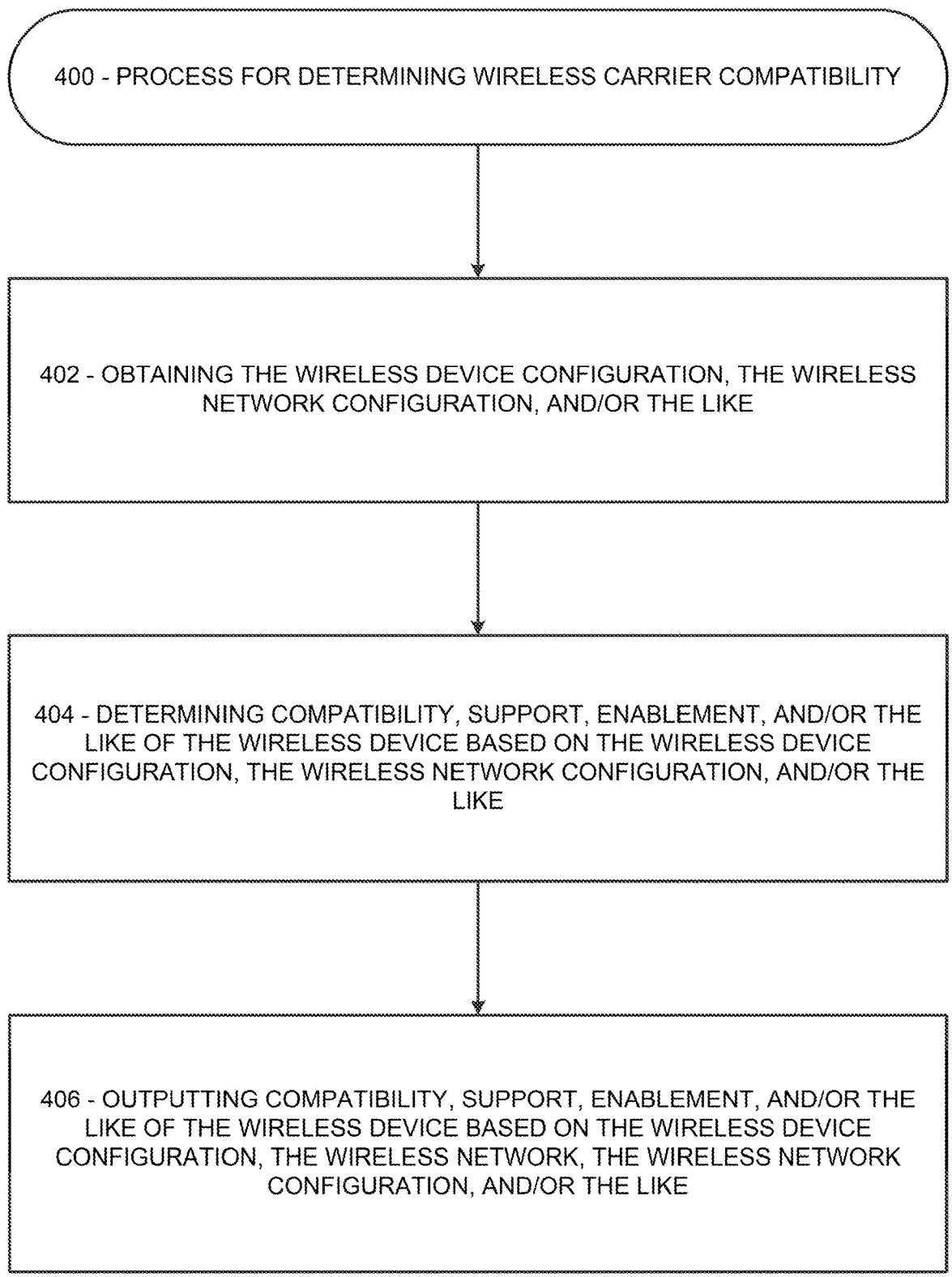
FIG. 4 illustrates a process for determining wireless carrier compatibility, in accordance with aspects of the disclosure.

FIG. 4 illustrates a process for determining wireless carrier compatibility, in accordance with aspects of the disclosure.

Aspects of FIG. 4 may include any one or more features, aspects, components, processes, and/or the like as described elsewhere herein. In particular, FIG. 4 illustrates a process for determining wireless carrier compatibility 400, which may be implemented at least in part by the system 252, the wireless carrier compatibility information processor 158, and/or the database 160, and/or a similar system, the wireless device 10, the wireless device 10 implementing the wireless device carrier compatibility application 22, and/or the like. In one aspect, the process for determining wireless carrier compatibility 400, the wireless carrier compatibility information processor 158, and/or the database 160 may be implemented at least in part by a MVNO. In one aspect, the process for determining wireless carrier compatibility 400, the wireless carrier compatibility information processor 158, and/or the database 160 may be implemented at least in part by an MNO. In one aspect, the process for determining wireless carrier compatibility 400, the wireless carrier compatibility information processor 158, and/or the database 160 may be implemented at least in part by a third party.

The process for determining wireless carrier compatibility 400 may include an obtaining process 402 (obtaining the wireless device configuration, the wireless network configuration, and/or the like). The obtaining process 402 may obtain the wireless device configuration, the wireless network configuration, and/or the like from the wireless network 102, the wireless device carrier compatibility application 22, the system 252, the database 160, the wireless carrier compatibility information processor 158, and/or the like. In one aspect, the system 252 may store wireless subscriber identification information, wireless network information, wireless equipment information, and/or the like in a database, such as the database 160. When the system 252 is implemented by a MVNO, this information is available from the wireless device identification information associated with subscriber accounts. In other aspects, this information can be obtained from the associated MNO, from the wireless network 102, and/or the like. In other aspects, this information is obtained from the wireless network 102, the wireless device carrier compatibility application 22, and/or the like.

The process for determining wireless carrier compatibility 400 may include a determining process 404 (determining compatibility, support, enablement, and/or the like of the wireless device based on the wireless device configuration, the wireless network configuration, and/or the like). The determining process 404 may compare the wireless device configuration, the wireless network configuration, and/or the like from the obtaining process 402 to known combinations that are compatible, to known combinations that are not compatible, and/or the like to ascertain compatibility. For example, a first type of wireless device configuration implemented on a second type of wireless network having a third wireless network configuration may be known to have compatibility. As a further example, a fourth type of wireless device configuration implemented on a second type of wireless network having a third wireless network configuration may be known to have incompatibility.

The process for determining wireless carrier compatibility 400 may query the wireless networks 102 and receive wireless carrier compatibility information from the wireless networks 102 and store the wireless carrier compatibility information in the database 160. For example, the query may be implemented by the Application Programming Interface (API) and associated processes as described herein. In one aspect, the system 252 may query each wireless carrier compatibility information processor 158 of each of the wireless networks 102 and receive wireless carrier compatibility information from the wireless networks 102 and store the wireless carrier compatibility information in the database 160.

The system 252 may query wireless networks and receive geographic location information from the wireless networks, the wireless device 10, and/or the like and store the geographic location information in the database 160. For example, the query may be implemented by the Application Programming Interface (API) and associated processes as described herein. In one aspect, the system 252 may query each wireless carrier compatibility information processor 158 of each of the wireless networks 102 and receive geographic location information from the wireless networks 102 and store the wireless carrier compatibility information in the database 160.

Figure 7:
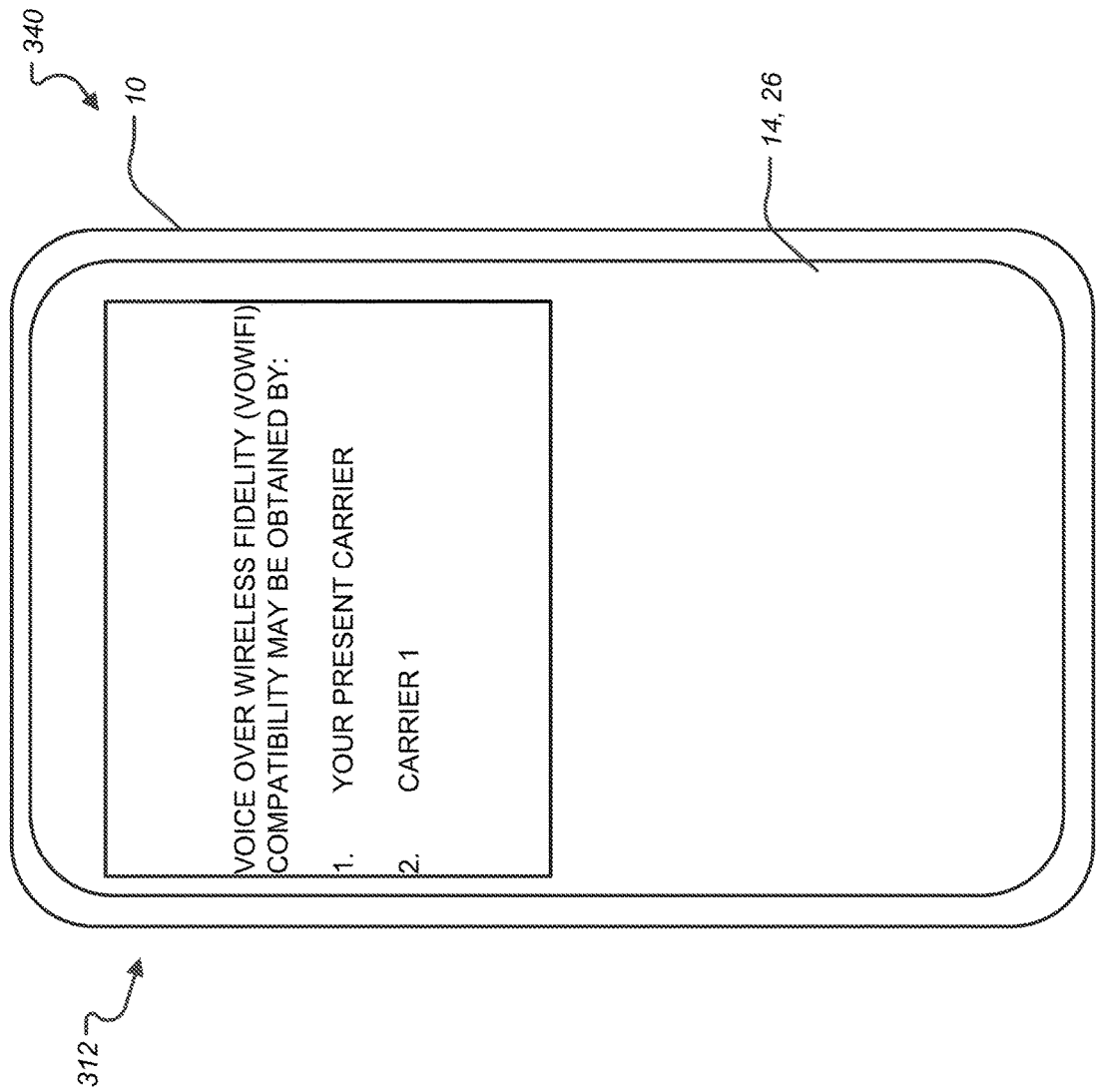
FIG. 7 illustrates a third exemplary graphical user interface according to aspects of the disclosure.
Figure 8:
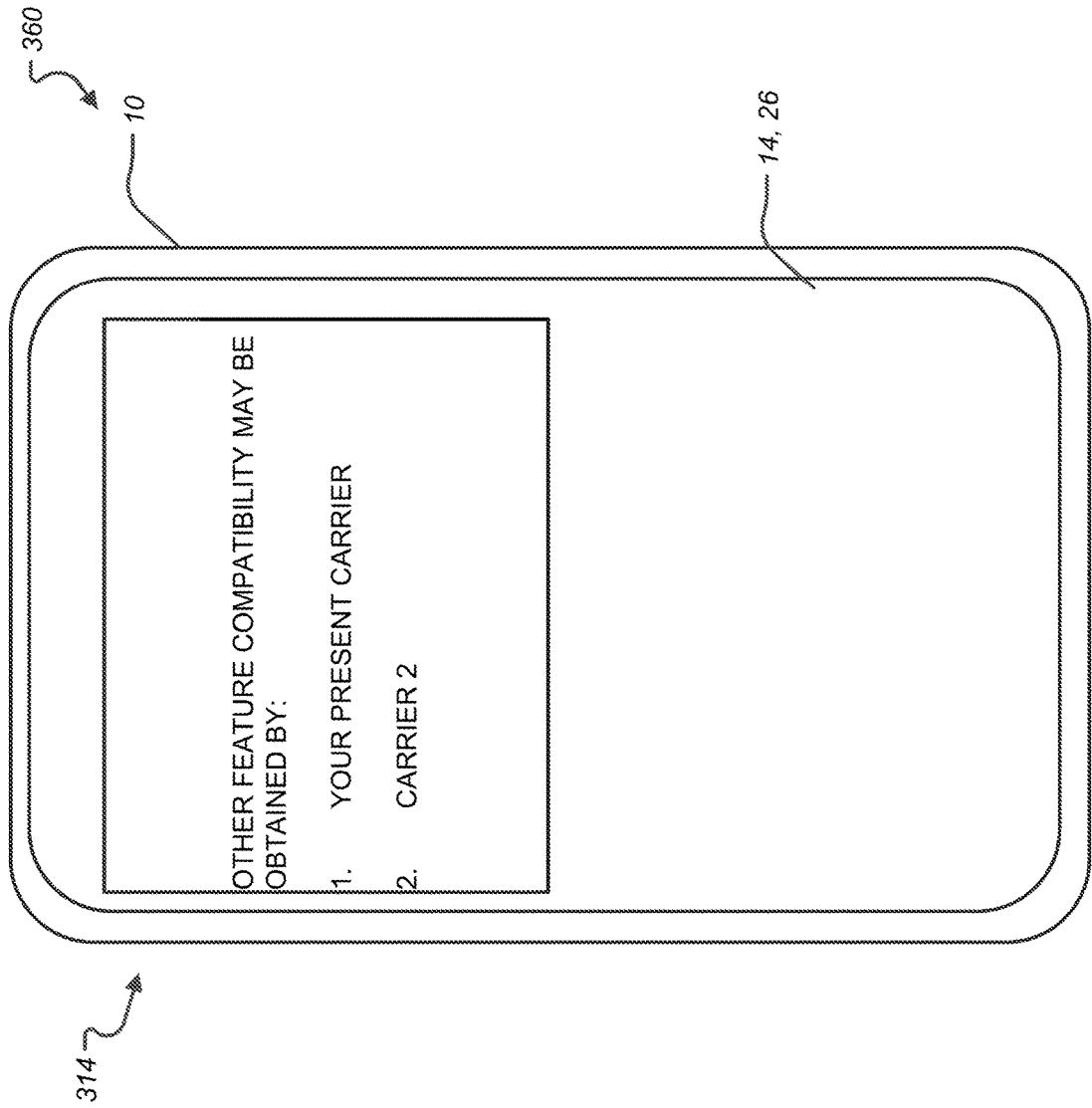
FIG. 8 illustrates a fourth exemplary graphical user interface according to aspects of the disclosure.

The process for determining wireless carrier compatibility 400 may include an outputting process 406 (outputting compatibility, support, enablement, and/or the like of the wireless device 10 based on the wireless device configuration, the wireless network configuration, and/or the like). The outputting process 406 may output the results of the determining process 404 to the display 14 and/or the user interface 26 of the wireless device 10 as illustrated in FIG. 6, FIG. 7, and FIG. 8.

The system 252 may analyze wireless carrier compatibility information, wireless equipment information, and geographic location information. In particular, the wireless carrier compatibility information processor 158 may utilize the statistical and/or artificial intelligence processes as described herein.

Figure 6:
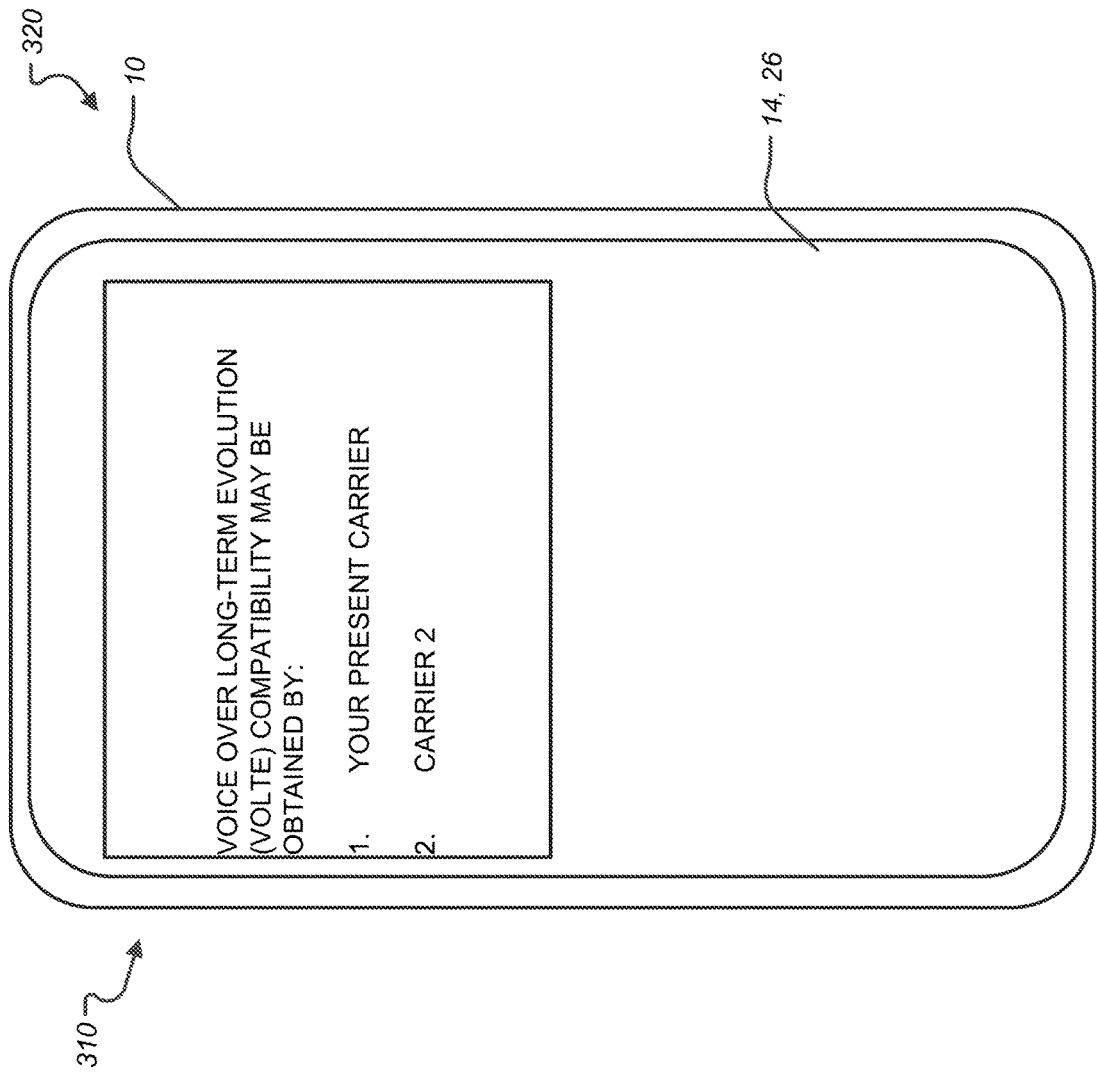
FIG. 6 illustrates a second exemplary graphical user interface according to aspects of the disclosure.

In one aspect, the outputting process 406 may output the results of the comparing process 402 to the display 14 and/or the user interface 26 of the wireless device 10 with a first compatibility output 310 as illustrated in FIG. 6. In one aspect, the outputting process 406 may output the results of the comparing process 402 to the display 14 and/or the user interface 26 of the wireless device 10 with a second compatibility output 312 as illustrated in FIG. 7. In one aspect, the outputting process [404] 406 may output the results of the comparing process 402 to the display 14 and/or the user interface 26 of the wireless device 10 with a third compatibility output 314 as illustrated in FIG. 8. Additionally, the outputting process 406 may output the operating bands of the wireless carrier and/or wireless network at the current location of the wireless device 10. For example, the outputting process 406 may output a spectrum band output 316 as illustrated in FIG. 9.

Returning to FIG. 1, the computer readable medium 16 may be configured to store the wireless device carrier compatibility application 22. For the purposes of this disclosure, computer readable medium 16 stores computer data, which may include computer program code that may be executable by the processor 18 of the wireless device 10 in machine-readable form. By way of example, and not limitation, the computer readable medium 16 may include computer readable storage media, for example tangible or fixed storage of data, or communication media for transient interpretation of code-containing signals. Computer readable storage media, as used herein, refers to non-transitory physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 16 or machine-readable medium, which may be incorporated into a computer program product.

The processor 18 may be configured to execute the wireless device carrier compatibility application 22. The processor 18 can be, for example, dedicated hardware as defined herein, a computing device as defined herein, a processor, a wireless device processor, a microprocessor, a wireless device chipset, a central processing unit (CPU), a programmable logic array (PLA), a programmable array logic (PAL), a generic array logic (GAL), a complex programmable logic device (CPLD), an application-specific integrated circuit (ASIC), a field-programmable gate array (FPGA), any other programmable logic device (PLD), and/or the like configurable to execute the wireless device carrier compatibility application 22.

The wireless device 10 may use the subscriber identity module (SIM) card or SIM 32. The SIM 32 may vary in size and may be a micro, mini, nano size, or any size implementation of the SIM 32. The SIM 32 may store network-specific information used to authenticate and identify subscribers on the network including one or more of an integrated circuit card identifier (ICCID), International Mobile Subscriber Identity (IMSI), Authentication Key (Ki), Local Area Identity (LAI), Operator-Specific Emergency Number, and/or the like. The SIM 32 may also store other carrier-specific data such as the SMSC (Short Message Service Center) number, Service Provider Name (SPN), Service Dialing Numbers (SDN), Advice-Of-Charge parameters, Value Added Service (VAS) applications, and/or the like. The SIM 32 may be identified by its ICCID. ICCIDs may be stored in the SIM cards. The ICCID is defined by the ITU-T recommendation E.118 as the Primary Account Number. The SIM 32 layout may be based on ISO/IEC 7812. In some aspects, the SIM 32 may also be a soft SIM, electronic SIM, or embedded SIM. In some aspects, other memory locations of the wireless device 10 may store carrier-specific data such as the International Mobile Subscriber Identity (IMSI), Authentication Key (Ki), Local Area Identity (LAI), Operator-Specific Emergency Number, the SMSC (Short Message Service Center) number, Service Provider Name (SPN), Service Dialing Numbers (SDN), Advice-Of-Charge parameters, Value Added Service (VAS) applications, and/or the like.

The wireless device carrier compatibility application 22 may be written in any programming language, such as, for example, C, Java, Objective-C, C+, Python, Visual Basic, Perl, or any other programming language the processor 18 is capable of executing. The wireless device carrier compatibility application 22 may be made available by the system 252, may be downloaded by the wireless device 10 from the system 252, may be stored on a chipset, the SIM 32 of the wireless device 10, stored in the memory 34, may be part of the system bios of the wireless device 10, downloaded from an application store, downloaded from a digital distribution source, and/or the like.

Figure 5:
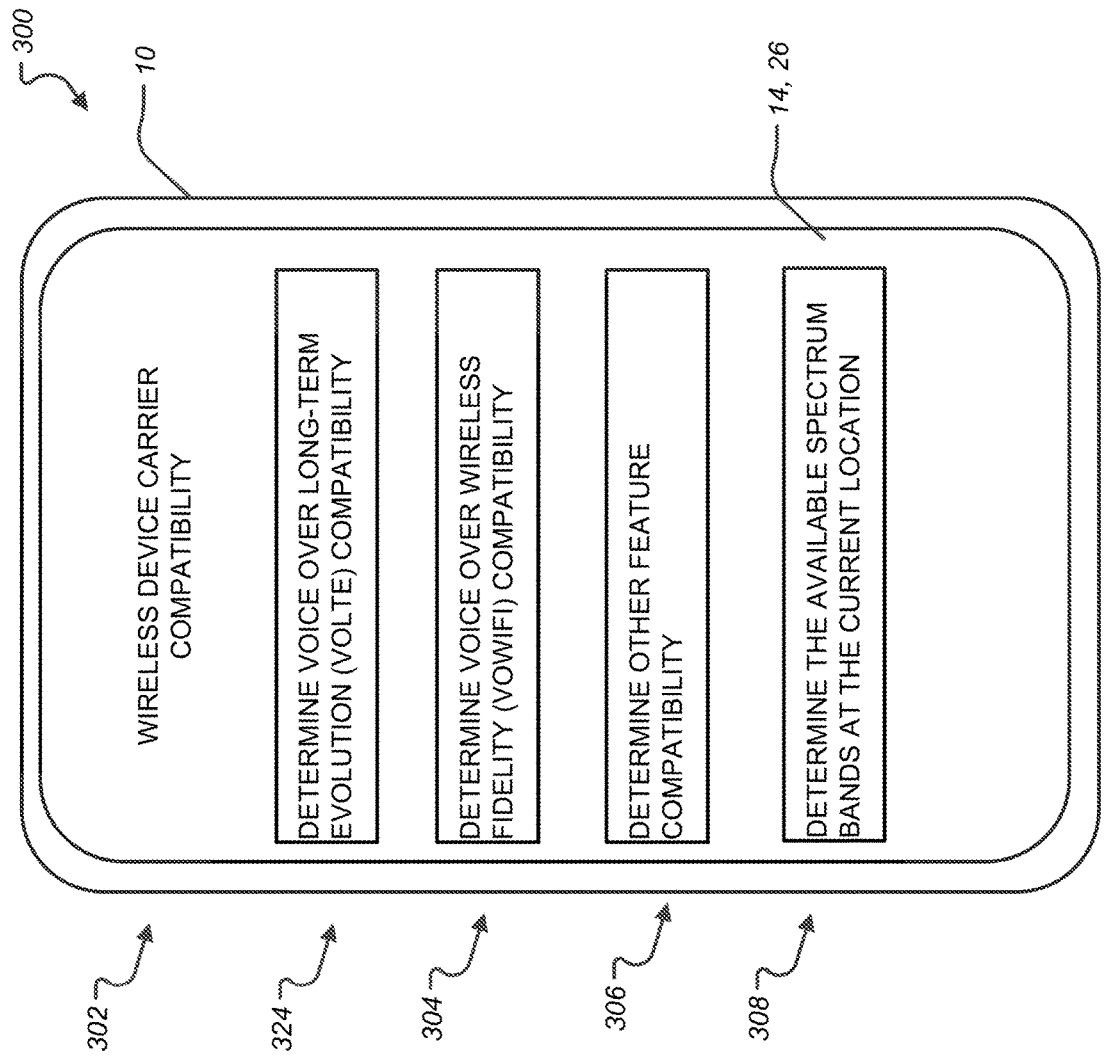
FIG. 5 illustrates a first exemplary graphical user interface according to aspects of the disclosure.

FIG. 5 illustrates a first exemplary graphical user interface according to aspects of the disclosure.

Aspects of FIG. 5 may include any one or more features, aspects, components, processes, and/or the like as described elsewhere herein. In particular, FIG. 5 illustrates a first exemplary graphical user interface 300 that may include a header 302 indicating the associated processes provided by the first exemplary graphical user interface 300. For example, the header 302 may provide text indicating "wireless device carrier compatibility."

The first exemplary graphical user interface 300 may further include input features for implementing one or more processes to determine wireless device carrier capability. The input features may include check boxes, radio buttons, virtual buttons, and/or the like.

As illustrated in FIG. 5, the first exemplary graphical user interface 300 may include an input 324 to launch a process to determine voice over long-term evolution (VoLTE) compatibility, an input 304 to launch a process to determine voice over wireless fidelity (VoWiFi) compatibility, an input 306 to launch a process to determine other feature compatibility, an input 308 to launch a process to determine spectrum bands at the current location, and/or the like consistent with the disclosure and/or as described in relation to the process for determining wireless carrier compatibility 400.

FIG. 6 illustrates a second exemplary graphical user interface according to aspects of the disclosure.

Aspects of FIG. 6 may include any one or more features, aspects, components, processes, and/or the like as described elsewhere herein. In particular, FIG. 6 illustrates a second exemplary graphical user interface 320 that may include the first compatibility output 310 in response to actuation of the input 324 to initiate the process to determine voice over long-term evolution (VoLTE) compatibility. The first compatibility output 310 may indicate what carriers may provide voice over long-term evolution (VoLTE) compatibility. For example, the first compatibility output 310 may indicate that "voice over long-term evolution (VoLTE) compatibility may be obtained by: 1. your present carrier; and 2. carrier 2." In other words, a wireless user may implement the wireless device carrier compatibility application 22, select the input 324, and be provided the first compatibility output 310, which may indicate what carriers may provide voice over long-term evolution (VoLTE) compatibility.

FIG. 7 illustrates a third exemplary graphical user interface according to aspects of the disclosure.

Aspects of FIG. 7 may include any one or more features, aspects, components, processes, and/or the like as described elsewhere herein. In particular, FIG. 7 illustrates a third exemplary graphical user interface 340 that may include the second compatibility output 312 in response to actuation of the input 304 to initiate the process to determine voice over wireless fidelity (VoWiFi) compatibility. The second compatibility output 312 may indicate what carriers may provide voice over wireless fidelity (VoWiFi) compatibility. For example, the second compatibility output 312 may indicate that "voice over wireless fidelity (VoWiFi) compatibility may be obtained by: 1. your present carrier; and 2. carrier 1" In other words, a wireless user may implement the wireless device carrier compatibility application 22, select the input 304, and be provided the second compatibility output 312, which may indicate what carriers may provide voice over wireless fidelity (VoWiFi) compatibility.

FIG. 8 illustrates a fourth exemplary graphical user interface according to aspects of the disclosure.

Aspects of FIG. 8 may include any one or more features, aspects, components, processes, and/or the like as described elsewhere herein. In particular, FIG. 8 illustrates a fourth exemplary graphical user interface 360 that may include the third compatibility output 314 in response to actuation of the input 306 to initiate the process to determine other feature compatibility. The third compatibility output 314 may indicate what carriers may provide other feature compatibility. For example, the third compatibility output 314 may indicate that "other feature compatibility may be obtained by: 1. your present carrier; and 2. carrier 2." In other words, a wireless user may implement the wireless device carrier compatibility application 22, select the input 306, and be provided the third compatibility output 314, which may indicate what carriers may provide other feature compatibility. Additionally, an intervening graphical user interface may query the user to designate which other feature is desired for compatibility determination.

FIG. 9 illustrates a fifth exemplary graphical user interface according to aspects of the disclosure.

Aspects of FIG. 9 may include any one or more features, aspects, components, processes, and/or the like as described elsewhere herein. In particular, FIG. 9 illustrates a fifth exemplary graphical user interface 380 that may include a spectrum band output 316 in response to actuation of the input 308 to initiate the process to determine available spectrum bands at the current location. The spectrum band output 316 may indicate the available spectrum bands at the current location. For example, the spectrum band output 316 may indicate that "the spectrum bands at the current location include: 1. operating band 22; 2. operating band 32; and 3. operating band 42." In other words, a wireless user may implement the wireless device carrier compatibility application 22, select the input 308, and be provided the spectrum band output 316, which may indicate the available spectrum bands at the current location.

Accordingly, the disclosed system, device, process, and application a provides a wireless user with information to determine whether a wireless device and/or a wireless carrier supports implementation of various features of a wireless device.

Further in accordance with various aspects of the disclosure, the methods described herein are intended for operation with dedicated hardware implementations including, but not limited to processors, microprocessors, wireless device chipsets, PCs, PDAs, SIM cards, semiconductors, application specific integrated circuits (ASIC), programmable logic arrays, cloud computing devices, and other hardware devices constructed to implement the methods described herein.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The wireless network 102 may include a home subscriber server (HSS), a user profile server function (UPSF), and/or the like. The HSS may be a master user database that supports IP Multimedia Core Network Subsystem (IMS) network entities. It may contain the subscription-related information (subscriber profiles), perform authentication and authorization of the user, and can provide information about the subscriber's location and IP information.

The wireless network 102 may include the Unified Data Management (UDM). The UDM may be configured to manage network user data in a single, centralized element. In some aspects, the UDM may be configured similar to a 4G network home subscriber service (HSS) and the 3G network home location register (HLR). In some aspects, the UDM may be configured as a cloud-native configuration and designed for 5G specifically.

A wireless network 102 may have its own subscriber profile repository, which can verify a wireless user account associated with the wireless device 10. When the wireless device 10 has been authenticated on a wireless network 102, the wireless device 10 may connect to a gateway support node associated with the wireless network 102 to receive wireless services including data, voice, text, SMS, and/or other wireless services available to the wireless device 10 on the wireless network 102. The gateway support node may also operatively link the wireless device 10 to communicate billing and policy services associated with the wireless network 102. Additionally, each of the wireless networks 102 may include a wireless carrier compatibility information processor 158 and database 160 implemented as described herein to determine wireless carrier compatibility.

The wireless networks 102 may include a Mobility Management Entity (MME). The MME may function as a key control-node. The MME may be responsible for idle mode of the wireless device 10 as well as paging and tagging procedures including retransmissions. The MME may be involved in the bearer activation/deactivation process and may also responsible for choosing a Signaling Gateway (SGW) for the wireless device 10 at the initial attach and at a time of intra-LTE handover involving Core Network (CN) node relocation. The MME may be responsible for authenticating the wireless device 10 by interacting with a home subscriber server (HSS) and/or Unified Data Management (UDM). Non Access Stratum (NAS) signaling may terminate at the MME and may also be responsible for generation and allocation of temporary identities to the wireless device 10. The MME may check the authorization of the wireless device 10 to camp on the service provider's Public Land Mobile Network (PLMN) and may enforce roaming restrictions on the wireless device 10. The MME may be a termination point in the wireless network 102 for ciphering/integrity protection for NAS signaling and may handle the security key management. The MME may also provide a control plane function for mobility between LTE and 2G/3G access networks with an S3 interface terminating at the MME from the Serving GPRS Support Node (SGSN). The MME may also terminate an S6a interface towards the home HSS for a roaming wireless device 10.

The SGW may be implemented as a network component responsible for transferring signaling messages (i.e. information related to call establishment, billing, location, short messages, address conversion, and other services) between Common Channel Signaling (CCS) nodes that communicate using different protocols and transports.

Each of the plurality of wireless networks 102 may include a public data network (PDN) gateway (PDN GW). The PDN GW may contain devices such as protocol translators, impedance matching devices, rate converters, fault isolators, or signal translators as necessary to provide system interoperability. The PDN GW may also require the establishment of mutually acceptable administrative procedures between networks.

The PDN may be a circuit-switched or packet-switched network that can transmit data in digital form. The PDN may provide any of X.25, frame relay, cell relay (ATM), or the like services. Access to a PDN generally includes a guaranteed bandwidth, known as the committed information rate (CIR).

The wireless network 102 may include an S5/S8 interface that may be used within the Evolved Packet Core (EPC) for LTE. The S5 interface may provide user plane tunneling and tunnel management between a serving GW and PDN GW. It may be used for Serving GW relocation due to the wireless device 10 mobility and if the serving GW needs to connect to a non-collocated PDN GW for the required PDN connectivity.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may include, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The disclosure may include communication channels 220 that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO), 4G, 5G, and/or the like, and/or a combination of two or more thereof.

The wireless device carrier compatibility application 22 described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system, or the like.

The disclosure may be implemented in any type of computing devices or processor, such as, e.g., a microprocessor, wireless device chipset, a desktop computer, personal computer, a laptop/mobile computer, a personal data assistant (PDA), a mobile phone, a tablet computer, cloud computing device, and the like, with wired/wireless communications capabilities via the communication channels 220.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The term text, text message, or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, 5G, and the like networks or networks associated with the communication channel as defined herein. In other aspects, text message may include Multimedia Messaging Service (MMS), which is a standard way to send messages that include multimedia content to and from mobile phones. It extends the core SMS (Short Message Service) capability that allowed exchange of text messages only up to 160 characters in length. While the most popular use is to send photographs from camera-equipped handsets, it is also used as a method of delivering news and entertainment content including videos, pictures, text pages, and ringtones. MMS can be used within the context of the disclosure for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

The term talk, voice, or voice calls as utilized herein may include voice calls defined by 3GPP (3rd Generation Partnership Project) with Voice Call Continuity (VCC) specifications in order to describe how a voice call can be persisted, as a mobile phone moves between circuit switched and packet switched radio domains (3GPP TS 23.206).

The term data as utilized herein includes mobile broadband or wireless Internet access delivered through mobile phone towers over a communication channel as defined herein to computers, mobile phones, wireless devices, and other digital devices as defined herein using portable modems. Some mobile services allow more than one device to be connected to the Internet using a single cellular connection using a process called tethering.

Aspects of the disclosure include an Application Programming Interface (API). The API may include a set of subroutine definitions, protocols, and tools for building software. The set may include a set of defined methods of communication between the various components of the disclosure. The API may be implemented as a web-based system, an operating system, a database system, a computer hardware, a software library, or the like. The API may include an API specification that may include specifications for routines, data structures, object classes, variables, remote calls, and/or the like. The API may be associated with or related to a software library. The API may describe and prescribe the expected behavior as a set of rules and the software library may be an implementation of this set of rules. In one aspect, the API may be a remote API configured to manipulate remote resources through protocols, specific standards for communication, or the like that allow different technologies to work together, regardless of language or platform. In one aspect, the API may be POSIX, Windows API. In one aspect, the API may be ASPI. In one aspect, the API may be Java API. In one aspect, the API may be Java Database Connectivity API.

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the disclosure are specifically illustrated and/or described herein. However, it will be appreciated that modifications and variations are contemplated and within the purview of the appended claims.

What is claimed is:

1. A wireless device, comprising:
   a processor configured to:
   obtain a wireless device configuration and at least one wireless network configuration;
   analyze the at least one wireless network configurations, at least a part of which being obtained from one of the following: a wireless device application or a wireless carrier; and
   determine, for a set of features for the at least one wireless network and the wireless device, wireless carrier compatibility information, wherein the set of features comprises virtual private network features; and
   a display configured to:
   receive the wireless carrier compatibility information; and
   display the wireless carrier compatibility information in response to the processor for the set of features,
   wherein the set of features further comprises voice over long-term evolution (VOLTE) (4G/5G), voice over wireless fidelity (VoWiFi), communication features, network features, Wi-Fi features, broadband features, networking features, application features, Internet of things (IoT) features, peripheral features, mobile body area networks (MBAN) features, entertainment features, encryption features, multimedia features, quality of service features, Video over LTE (ViLTEp) features, session initiation protocol (SIP) features, application server (AS) features, IP multimedia subsystem (IMS) architectural framework features, MNO features, MVNO features, compatibility features, enhanced voice services (EVS) features, source-controlled variable bit-rate (SC-VBR) features, voice/sound activity detector (VAD) features, comfort noise generation (CNG) features, error concealment (EC) for packet loss in networks features, channel-aware mode to improve frame/packet error resilience features, and jitter buffer management (IBM) features.

2. The system of claim 1, wherein the processor is further configured to:
   obtain the wireless device configuration based on an identification of the wireless device, wherein the identification of the wireless device comprises an international mobile equipment identity (IMEi).

3. The system of claim 1, wherein the processor is further configured to:
   obtain the wireless device configuration based on one or more of the following types, versions, or characteristics of: a transceiver of the wireless device, the processor, a subscriber identity module (SIM) card of the wireless device, a codec of the wireless device, or a firmware of the wireless device.

4. The system of claim 1, wherein at least one of the wireless device configuration or the wireless network configuration is remotely stored at a database.

5. The system of claim 1, wherein the processor is further configured to obtain location information from the wireless device and to determine wireless carrier compatibility information for the set of features based on the location information of the wireless device.

6. The system of claim 1, wherein the wireless carrier compatibility information for the set of features comprises information indicating a support for one or more of the features.

7. The system of claim 1, wherein the processor is further configured to obtain the wireless network configuration based on implementation of particular wireless bands that support the set of features.

8. The system of claim 1, wherein the processor is further configured to compare the wireless device configuration and the wireless network configuration to at least one of a first set of predetermined combinations that are compatible and a second set of predetermined combinations that are not compatible.

9. A computer-implemented process, comprising:
   obtaining, from at least one of an application of at least one wireless device or a compatibility information processor associated with a wireless carrier, a configuration of each of at least one wireless network and the at least one device;
   analyzing the configurations;
   determining compatibility information for a set of features involving the at least one device and the at least one network, wherein the set of features comprises virtual private network features;
   obtaining the compatibility information; and
   responsive to a processor for the set of features, outputting the obtained information,
   wherein the set of features further comprises voice over long-term evolution (VOLTE) (4G/5G), voice over wireless fidelity (VoWiFi), communication features, network features, Wi-Fi features, broadband features, networking features, application features, Internet of things (IoT) features, peripheral features, mobile body area networks (MBAN) features, entertainment features, encryption features, multimedia features, quality of service features, Video over LTE (ViLTEp) features, session initiation protocol (SIP) features, application server (AS) features, IP multimedia subsystem (IMS) architectural framework features, MNO features, MVNO features, compatibility features, enhanced voice services (EVS) features, source-controlled variable bit-rate (SC-VBR) features, voice/sound activity detector (VAD) features, comfort noise generation (CNG) features, error concealment (EC) for packet loss in networks features, channel-aware mode to improve frame/packet error resilience features, and jitter buffer management (IBM) features.

10. The process of claim 9, wherein the processor is further configured to obtain the at least one device configuration based on an identification of the at least one device, and wherein the identification of the at least one device comprises an IMEi.

11. The process of claim 9, further comprising:
obtaining the at least one device configuration based on one or more of the following types, versions, or characteristics of: a transceiver of the at least one device, a processor of the at least one device, a SIM card of the at least one device, a codec of the at least one device, or a firmware of the at least one device.

12. The process of claim 9, further comprising:
providing a database configured to store the at least one device configuration and the at least one network configuration.

13. The process of claim 9, further comprising:
obtaining location information from the at least one device; and
determining wireless carrier compatibility information for the set of features based on the location information of the at least one device.

14. The process of claim 9, wherein the wireless carrier compatibility information for the set of features comprises information indicating support for the set of features.

15. The process of claim 9, further comprising:
obtaining the at least one network configuration based on implementation of particular wireless bands that support the set of features.

16. The process of claim 9, further comprising:
comparing the at least one device configuration and the at least one network configuration to at least one of a first set of predetermined combinations that are compatible and a second set of predetermined combinations that are not compatible.

17. The process of claim 13, further comprising:
responsive to an interaction at a user interface, outputting a plurality of spectrum bands to initiate a determination of spectrum bands available at a location determined based on the location information.

* * * * *